United States Patent [19]

Marshall

[11] 3,978,027

[45] Aug. 31, 1976

[54] PROCESS FOR REACTING A PHENOL WITH AN EPOXY COMPOUND

[75] Inventor: Clifford D. Marshall, Cherry Hill, N.J.

[73] Assignee: Shell Oil Company, Houston, Tex.

[22] Filed: May 7, 1975

[21] Appl. No.: 575,276

[52] U.S. Cl. .............................................. 260/47 EP
[51] Int. Cl.² ........................................ C08G 30/04
[58] Field of Search .......... 260/47 EP, 47 A, 613 B, 260/49, 348 R

[56] References Cited
UNITED STATES PATENTS

| | | | |
|---|---|---|---|
| 3,294,865 | 12/1966 | Price | 260/2 EC X |
| 3,477,990 | 11/1969 | Dante et al. | 260/47 |
| 3,547,881 | 12/1970 | Mueller et al. | 260/47 |
| 3,824,212 | 7/1974 | Sinnema et al. | 260/47 |

Primary Examiner—Murray Tillman
Assistant Examiner—T. Pertilla

[57] ABSTRACT

A process for reacting a phenol with an epoxy-containing compound is disclosed. This process comprises reacting a polyepoxide having more than one vic-epoxy group with a phenol in the presence of a potassium iodide catalyst. The products resulting from this process are also disclosed.

2 Claims, No Drawings

PROCESS FOR REACTING A PHENOL WITH AN EPOXY COMPOUND

BACKGROUND OF THE INVENTION

This invention relates to a process for reacting a phenol with an epoxy-containing compound and to the resulting products. More particularly, the invention relates to a process for effecting a specific reaction between compounds possessing a vic-epoxy group and a phenolic hydroxyl group, and to the products obtained thereby.

The Prior Art

Epoxy compounds are well known and include many compounds of varying molecular weight and epoxy equivalent weight. To simplify the production of a large number of epoxy compound that vary mainly in molecular weight, it is common practice to manufacture a single epoxy compound of specified molecular weight and react the epoxy compound with a compound containing phenolic hydroxyl groups in the presence of catalyst so as to obtain epoxy of phenolic hydroxy ether compounds of desired higher molecular weight. The conventional catalysts employed were inorganic bases or tertiary amines which were also effective catalysts for competing reactions of epoxides with alcoholic hydroxyl groups, homopolymerization of epoxy groups and the like. As a result, the product obtained was a mixture of polymers and resins with varying degrees of molecular weight, chain branching and end group functionality. Such a composition detracts from the performance and utility of the product. More recent catalysts with improved selectivity include phosphonium halides as disclosed in U.S. Pat. No. 3,477,990, phosphines as disclosed in U.S. Pat. No. 3,547,881, and 3-(trihydrocarbylphosphoranylidene)-2,5-pyrrolidinediones as disclosed in U.S. Pat. No. 3,843,605. However, where it is desired to employ the epoxy compound obtained by use of these catalysts to provide a protective coating for the packaging and storage of foodstuffs, it is necessary that the coating system be approved by the Food and Drug Administration (FDA) for food applications. The coating systems based on resins produced using the catalysts disclosed in three above-noted patents do not as yet have FDA approval.

A number of available catalysts having prior FDA approval could be employed to react a polyepoxide with a phenol compound, yet do not meet other practical requirements. A suitable catalyst for reacting a polyepoxide with a phenol to produce a phenolic hydroxy ether resin for use as a coating for foodstuffs should (1) have sufficient activity to result in an economically short reaction time, (2) have sufficient "dump stability", that is, be sufficiently inactive at the point of having reached the desired reaction product that the product remains in the specification range for at least two hours (time required to dump or remove the fusion product from the batch reactor), (3) by readily available, and (4) be FDA approved. For example, when it is desired to produce a phenolic hydroxy ether resin having an epoxide equivalent weight of between about 2000 and about 4000 by reacting 2,2-bis(4-hydroxyphenyl)propane and a liquid diglycidyl ether of 2,2-bis(4-hydroxyphenyl)propane having a saponifiable chlorine content of about 0.1% weight or higher, present as vicinal chlorohydrin (hereinafter referred to as "saponifiable chlorine") and a epoxide equivalent weight of between about 140 and 500, it has been found that sodium hydroxide and sodium carbonate are not suitable catalysts. Sodium hydroxide and sodium carbonate have FDA approval for use with coatings on foodstuff containers, are readily available, but are deactivated at low levels that provide dump stability and do not show dump stability when used at higher levels that provide sufficiently short overall reaction times. Likewise, sodium bromide, potassium bromide, calcium bromide, calcium chloride, and sodium chloride catalysts do not show sufficient dump stability.. Sodium iodide catalyst becomes deactivated and yields a lower molecular weight product than desired. Sodium acetate and sodium benzoate catalysts are very sluggish catalysts while calcium oxide and calcium hydroxide catalysts are not readily dispensible in the reaction mixture and therefore are not suitable. It has now been found that potassium iodide catalyst meets all four practical requirements for a fusion catalyst.

SUMMARY OF THE INVENTION

Potassium iodide is a useful catalyst in the process of reacting a compound containing at least one vice-epoxy group with a phenol processing at least one and preferably two or more phenolic hydroxyl groups to form phenolic hydroxy ethers.

Detailed Description of the Invention

The process of the invention involves the reaction of an epoxy compound and a phenol in the presence of potassium iodide as the catalyst to form the desired phenolic hydroxy ether of the partial formula

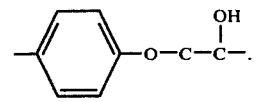

While catalysts selected from the group consisting of the iodide salts of alkali metals and alkali earth metals are useful catalysts in reacting a polyepoxide with a phenol compound, potassium iodide is a much preferred catalyst.

The Polyepoxides

The liquid polyepoxides employed in the present invention include those compounds possessing more than one vic-epoxy group per molecule, i.e. more than one

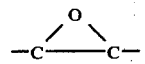

group per molecule. These polyepoxides are saturated or unsaturated, aliphatic, cycloaliphatic, aromatic or heterocyclic, and are substituted, if desired, with non-interfering substituents, such as halogen atoms, hydroxy groups, ether radicals, and the like. Polyepoxides employed are monomeric or polymeric. Preferred liquid polyepoxides include the so-called liquid glycidyl polyethers of polyhydric phenols and polyhydric alcohols. More preferred are the glycidyl polyethers of 2,2-bis(4-hydroxyphenyl)propane having an average molecular weight between about 300 and about 900 and a epoxide equivalent weight of between about 140 and about 500. Especially preferred are the glycidyl polyethers of 2,2-bis(4-hydroxyphenyl)propane having an average molecular weight of between about 300 and about 900, an epoxide equivalent weight of between about 140 and about 500, and containing from about 0.1% to about 1.0% weight or higher saponifiable chlorine. As used herein the terms "epoxide equivalent weight" and "weight per epoxide" refer to the average molecular weight of the polyepoxide molecule divided by the average number of oxirane groups present in the molecule.

Various examples of polyepoxides that may be used in this invention are given in U.S. Pat. No. 3,477,990 (e.g., column 2, line 39 to column 4, line 75) and it is to be understood that so much of the disclosure of that patent relative to examples of polyepoxides is incorporated by reference into this specification.

The Phenols

The phenols used in the process of the invention are those compounds possessing at least one hydroxyl group attached to an aromatic nucleus. The phenols are monohydric or polyhydric and are substituted, if desired, with a great variety of different types of substituents. Examples of the phenols include among others, phenol, resorcinol, o-cresol, m-cresol, p-cresol, chlorophenol, nitrophenol, hydroquinone, 2,2-bis(4-hydroxyphenyl)propane, 2,2-bis(4-hydroxyphenyl)pentane, and the like, and polymeric type polyhydric phenols obtained by condensing monohydric or polyhydric phenols with formaldehyde.

Preferred phenols to be used are the polyhydric phenols containing from 2 to 6 OH groups and up to 30 carbon atoms. Coming under special consideration are the phenols of the formula

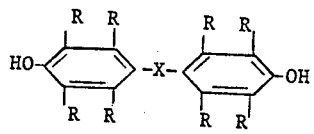

wherein X is a polyvalent element or radical and R independently is a member of the group consisting of hydrogen, halogen and hydrocarbon radicals. The preferred elements or radicals represented by X are oxygen, sulfur, —SO—, —SO$_2$—, divalent hydrocarbon radicals containing up to 10 carbon atoms and oxygen, silicon, sulfur or nitrogen containing hydrocarbon radicals, such as —OR'O—, —OR'OR'O—, —S—R'—S—, —S—R'—S—R'—S, —OSiO—, —OSiOSiO—,

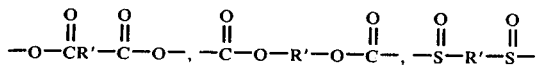

—SO$_2$—R'—SO$_2$— radicals wherein R' is a divalent hydrocarbon radical.

Various examples of phenols that may be used in this invention are also given in U.S. Pat. No. 3,477,990 (e.g., column 5, line 1 to column 6, line 10) and it is to be understood that so much of the disclosure of that patent relative to examples of phenols is incorporated by reference into this specification.

Preparation of the Phenolic Hydroxy Ether Compounds

The amount of the epoxide and the phenol to be employed in the process varies over a wide range depending upon the type of reactants and the type of product to be produced. In general, these reactants are used in approximately chemical equivalent amounts, i.e., a chemical equivalent amount of the phenol will be that sufficient to furnish one phenolic hydroxyl for every epoxy group to be reacted. For example, if one is reacting a diepoxide with a monohydric phenol and both epoxy groups are to be reacted, one mole of diepoxide should be reacted with about two moles of the monohydric phenol. On the other hand, if one is reacting a diepoxide with a dihydric phenol and a monomer product is desired by reacting both epoxide groups, one should react one mole of the diepoxide with about 2 moles of the polyhydric phenol. If a polymeric product is desired smaller ratios should be utilized as desired, such as, for example, 4 moles of the diepoxide and 5 moles of the polyhydric phenols.

Superior results are obtained when the higher molecular weight resins are produced and in this case the ratios of reactants are varied depending upon the molecular weight desired and upon the type of end groups, i.e., whether the product is to be terminated with an epoxide or with a phenol.

An especially preferred use of the present invention is in the preparation of a phenolic hydroxy ether resin having a epoxide equivalent weight of between about 2000 and about 4000 wherein the resin is prepared by reacting 2,2-bis(4-hydroxyphenyl)propane with the diglycidyl ether of 2,2-bis(4-hydroxyphenyl)propane having a saponfiable chlorine content of between about 0.1% and about 1.0% weight and an epoxide equivalent weight of between about 140 and about 500.

The amount of the catalyst employed varies widely. In general, the amount of catalyst varies from about 0.001% to about 1% by weight, of the total reactants, more preferably from about 0.002% to about 0.2% and most preferably from about 0.03% to about 0.1% by weight of the reactants.

The reaction is conducted in the presence or absence of solvents or diluents. In most cases, the reactants are liquid and the reaction is easily effected without the addition of solvents or diluents. However, in some cases, where either or both reactants are solids or viscous liquids it is desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent is typically retained in the reaction mixture. Otherwise, the solvent is removed by any suitable method such as by distillation or the like.

When it is desired to produce phenolic hydroxy ethers of higher viscosities but not higher epoxide equivalent weights, the polyepoxide and phenol are subjected to thermal bodying prior to the addition of the catalyst. "Thermal bodying" refers to heating the polyepoxide-phenol mixture at specified temperatures and times prior to adding the catalyst. A preferred thermal bodying treatment comprises heating the polyepoxidephenol mixture to a temperature of between about 250°F and 400°F, preferably between about 300°F and about 325°F, for between about 15 minutes and 60 minutes.

The products obtained by the above process are the desired phenolic hydroxy ether compounds. Their physical characteristics depend upon the desired reactants and proportions. In general, the products vary from liquids to solids, and in the case of the high molecular weight resins vary from viscous liquids to hard solids. The products possess at least one alcoholic hydroxyl group formed by each reaction of the epoxide and phenolic hydroxyl group, and can be further reacted through this group or groups. The polyfunctional reactants also give products terminated in phenolic hydroxyl groups and/or epoxy groups, and these are available for further reaction.

A group of products which are particularly outstanding are those resins and polymers obtained by the reaction of the polyepoxides and polyhydric phenols in controlled proportions. Those which use an excess of the polyepoxide are terminated in epoxy groups and can be used as polepoxides in known reactions of polyepoxides and curing agents and the like. These high molecular weight polyepoxides are particularly useful in preparing surface coatings, adhesive, laminates, filament windings, coatings for highways and airfields, structural applications, formation of foams and the like. Those prepared from the halogenated polyhydric phenols are particularly useful as flame proofing resins for forming laminates, coatings and the like. As stated earlier, the present invention is particularly useful for preparing epoxy resins to be used as coatings for the packaging and storing of foodstuffs.

Curing of the Epoxy Containing, Phenolic Hydroxy Ether Compounds

The epoxy-containing, phenolic hydroxy ether compounds obtained by use of the present invention are reacted with various conventional curing agents to form hard insoluble, infusible products. Examples of suitable curing agents include, among others, the polybasic acids and their anhydrides such as the di, tri- and higher carboxylic acids; those acids containing sulfur, nitrogen, phosphorus or halogens; amino-containing compounds such as, for example, diethylene triamine and pyridine; polyamides containing active amino and-/or carboxyl groups; and others.

The amount of curing agent varies considerably depending upon the particular agent employed. For the alkalies or phenoxides, 1% to 4% by weight is generally suitable. With phosphoric acid and esters thereof, good results are obtained with 1 to 10% by weight added. The tertiary amine compounds are preferably used in amounts of about 1% to 15% by weight. The acids, anhydrides, polyamides, polyamines, polymercaptans, etc. are preferably used in at least 0.8 equivalent amounts, and preferably 0.8 to 1.5 equivalent amounts. An equivalent amount refers to that amount needed to give one active hydride (or anhydride group) per epoxy group.

Solvents or diluents are sometimes added to make the composition more fluid or sprayable. Preferred solvents or diluents include those which are volatile and escape from the polyepoxide composition before or during cure such as esters, chlorinated hydrocarbons and the like. To minimize expense, these active solvents are often used in admixture with aromatic hydrocarbons such as benzene, toluene, xylene, etc. and/or alcohols such as ethyl, isopropyl or n-butyl alcohol.

Solvents which remain in the cured compositions are used, such as diethyl phthalate, dibutyl phthalate and the like, as well as cyano-substituted hydrocarbons, such as acetonitrile, propionitrile, adiponitrile, benzonitrile, and the like. It is also convenient to employ normally liquid glycidyl compounds, glycidyl cyclopentyl ether, diglycidyl ether, glycidyl ether of glycerol and the like, and mixtures thereof.

Other materials are also added to the composition as desired. This includes other types of polyepoxides such as described in U.S. Pat. No. 3,477,990. This also includes fillers, such as sand, rock, resin particles, graphite, asbestos, glass or metal oxide fibers, and the like, plasticizers, stabilizers, asphalts, tars, resins, insecticides, fungicides, anti-oxidants, pigments, stains and the like.

The temperature employed in the cure varies depending chiefly on the type of curing agent. The amino-containing curing agents generally cure at or near temperature and no heat need be applied. The acids, anhydrides, and melamine derivatives, on the other hand, generally require heat, such as temperatures ranging from about 150°F to about 400°F. Preferred temperatures range from about 200°F to about 400°F and more preferably from about 250°F to 380°F.

The compositions containing the polyepoxides and curing agents are used for a variety of important applications. They are used, for example, as adhesives for metal, wood, concrete, plaster and the like, and as surface coatings for various types of surfaces. The new compositions are also used in the preparation of laminates or resinous particles reinforced with fibrous textiles. They are also used in the formation of castings and molding and for the encapsulation of electrical equipment.

The invention is further illustrated by means of the following Illustrative Embodiment and Comparative Example. Note that the embodiment and example are given for the purpose of illustration only and that the invention is not to be regarded as limited to any of the specific conditions or reactants noted therein.

As used in Tables I and II which follow, "WPE" refers to weight per epoxide and "viscosity" refers to the Gardner-Holdt viscosity of a 40% weight solution of the phenolic hydroxy ether compound in butyl DIOX-ITOL glycol ether at 25°C. Gardner-Holdt viscosity is measured according to ASTM Method D-1545, and the significance of the measurement is discussed in J. J. Mattiello, Protective and Decorative Coatings, Volume V, p. 186 (1946).

ILLUSTRATIVE EMBODIMENT I

Illustrative Embodiment I reveals the use of potassium iodide as a fusion catalyst. The desired fusion product has a WPE of between 2500 and 4000 and a Garnder-Holdt viscosity of $Z_2$–$Z_5$. The starting epoxy compound was a liquid polyepoxide having a WPE of 193 and the starting phenolic compound was 2,2-bis(4-hydroxyphenyl)propane (BPA). The saponifiable chlorine content of the liquid polyepoxide was 0.165% weight. In all runs, the initial reaction composition prior to catalyst addition was 65.5% weight liquid epoxide resin and 34.5% weight BPA.

In all runs, 1115 grams of liquid epoxide resin were charged to a 2.5 liter glass resin kettle equipped with an anchor stirrer, thermometer, Glas-Col heater, sampling port and gas sparge tube. The stirred resin was heated to 220°F while being sparged with 1 standard cubic foot per hour nitrogen. Then 585 grams of BPA were charged and the mixture brought back to 220°F. In some of the runs, as noted, the mixture was subjected to a thermal bodying step prior to catalyst addition. The potassium iodide catalyst, as a 25% weight aqueous solution, was charged to the reactor in amounts as noted. Heat was then applied so as to reach the reaction temperature over a 60 to 90 minute period. The reaction mixture was then held at the reaction temperature for various time periods and the resulting products was analyzed for equivalent epoxide weight and viscosity. "Hours to Start of Dump" signifies the time elapsed between the time at which the catalyst was added until the reaction product was at or near a WPE of 2500. The results are shown below in Table I.

TABLE I

| Run No. | | 1 | 2 | 3 | 4 | 5 | 6 |
|---|---|---|---|---|---|---|---|
| Thermal Bodying Minutes/°F | | No — | Yes 20/305 | Yes 20/325 | Yes 40/305 | Yes 40/305 | No — |
| Catalyst | | KI | KI | KI | KI | KI | KI |
| Concentration (milliequivalents per 100 grams) | | 0.23 | 0.23 | 0.23 | 0.23 | 0.23 | 0.355 |
| Reaction Temperature,°F | | 380 | 380 | 380 | 380 | 400 | 380 |
| Hours to Start of Dump | | 2.0 | 2.0 | 1.65 | 1.6 | 1.25 | 3.0 |
| Dump Stability | | | | | | | |
| 0 Hour: | WPE | 2320 | 2415 | 2790 | 2510 | 2347 | 2484 |
| | Viscosity | Y | $Z^-$ | $Z_2$ | $Z-Z_1$ | na | na |
| 1 Hour: | WPE | 2809 | 2720 | 3306 | 2987 | 2860 | 2747 |
| | Viscosity | $Z-Z_1$ | $Z_1$ | $Z_4^-$ | $Z_3$ | na | na |
| 2 Hours: | WPE | 3031 | 2953 | 3658 | 3236 | 3170 | 2955 |
| | Viscosity | $Z_1^+$ | $Z_2^-$ | $Z_5^-$ | $Z_3-Z_4$ | na | na |
| 3 Hours: | WPE | 3248 | 3070 | 3850 | 3506 | 3560 | 3194 |
| | Viscosity | $Z_2$ | $Z_2$ | $Z_5^+$ | $Z_4$ | $Z_4$ | na | na - not available

COMPARATIVE EXAMPLE I

Comparative Example I was conducted in an identical manner and with the identical starting reactants as in Illustrative Embodiment I except that different catalysts were employed. The results are shown below in Table II. In runs 7–11 and 14–17, no testing beyond that indicated was done because the time that had lapsed since the catalyst was added exceeded 5 hours.

TABLE II

| Run No. | | 7 | 8 | 9 | 10 | 11 | 12 |
|---|---|---|---|---|---|---|---|
| Thermal Bodying Minutes/°F | | No — | No — | No — | No — | No — | No — |
| Catalyst | | NaI | KBr | NaBr | $CaBr_2$ | $KIO_3$ | $CaCl_2$ |
| Concentration (milliequivalents per 100 grams) | | 0.23 | 0.23 | 0.23 | 0.23 | 0.23 | 0.3 |
| Reaction Temperature,°F | | 380 | 380 | 380 | 380 | 380 | 380 |
| Hours to Start of Dump | | 4.0 | 3.0 | 4.0 | 4.0 | 6.0 | 4.75 |
| Dump Stability | | | | | | | |
| 0 Hour: | WPE | 2044 | 2048 | 2398 | 1984 | 2505 | 2006 |
| | Viscosity | na | na | $Z_1^-$ | X-Y | na | Y |
| 1 Hour: | WPE | 2233 | 2726 | 2917 | 2821 | | Near gel |
| | Viscosity | $X^+$ | $Z_2$ | $Z_3-Z_4$ | $Z_2-Z_4$ | | Point |
| 2 Hours: | WPE | | 3259 | | | | |
| | Viscosity | | $Z_4^+$ | | | | |
| 3 Hours: | WPE | | | | | | |
| | Viscosity | | | | | | |

| Run No. | | 13 | 14 | 15 | 16 | 17 |
|---|---|---|---|---|---|---|
| Thermal Bodying Minutes/°F | | No — | No — | No — | No — | No — |
| Catalyst | | $CaCl_2$ | $Na_2CO_3$ | NaOH | $C_6H_5CO_2Na$ | CaO |
| Concentration (milliequivalents per 100 grams) | | 0.89 | 0.066 | 0.6 | 0.3 | 0.29 |
| Reaction Temperature,°F | | 380 | 380 | 380 | 380 | 380 |
| Hours to Start of Dump | | 2.0 | 5.66 | 6.0 | 8.0 | 5.0 |
| Dump Stability | | | | | | |
| 0 Hour: | WPE | 1869 | 2407 | 2116 | 2551 | 827 |
| | Viscosity | na | na | na | na | na |
| 1 Hour: | WPE | 2990 | | | | |
| | Viscosity | $Z_1^+$ | | | | |
| 2 Hours: | WPE | 3989 | | | | |
| | Viscosity | $Z_4$ | | | | |
| 3 Hours: | WPE | | | | | |
| | Viscosity | | | | | | na - not available

I claim as my invention:

1. In the process for producing polepoxide resins having a weight per epoxide of between about 2,000 and about 4,000 by reacting a liquid diglycidyl ether of 2,2-bis(4-hydroxyphenyl)propane having a weight per epoxide of between about 140 and about 500 and a saponifiable chlorine content of between about 0.1% weight and about 1.0% weight with 2,2-bis(4-hydroxyphenyl)propane in the presence of a potassium iodide catalyst, the improvement wherein said liquid diglycidyl ether of 2,2-bis(4-hydroxyphenyl)propane and said 2,2-bis(4-hydroxyphenyl)propane are contacted at a temperature of between about 250°F and about 400°F for between about 15 minutes and about 60 minutes prior to the addition of the potassium iodide catalyst.

2. The process as in claim 1 wherein the amount of potassium iodide catalyst employed is between about 0.002% and about 0.2% by weight of the total reactants.

* * * * *